United States Patent
Ohtani et al.

(10) Patent No.: US 7,166,386 B2
(45) Date of Patent: Jan. 23, 2007

(54) SEPARATOR FOR FUEL CELL AND METHOD FOR PREPARATION THEREOF

(75) Inventors: Teruyuki Ohtani, Wako (JP); Makoto Tsuji, Wako (JP); Masao Utsunomiya, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 195 days.

(21) Appl. No.: 10/489,303

(22) PCT Filed: Jul. 22, 2002

(86) PCT No.: PCT/JP02/07397

§ 371 (c)(1),
(2), (4) Date: Mar. 16, 2004

(87) PCT Pub. No.: WO03/028134

PCT Pub. Date: Apr. 3, 2003

(65) Prior Publication Data

US 2004/0253501 A1   Dec. 16, 2004

(30) Foreign Application Priority Data

Sep. 19, 2001   (JP) ............................. 2001-285106
Sep. 26, 2001   (JP) ............................. 2001-294572

(51) Int. Cl.
*H01M 8/02* (2006.01)
*H01M 8/10* (2006.01)

(52) U.S. Cl. .......................... 429/129; 429/34; 429/247

(58) Field of Classification Search .................. None
See application file for complete search history.

(56) References Cited

U.S. PATENT DOCUMENTS

| | | | | | |
|---|---|---|---|---|---|
| 21,470 | A | * | 9/1858 | May et al. | 396/510 |
| 33,048 | A | * | 8/1861 | McIntosh et al. | 126/69 |
| 5,698,337 | A | * | 12/1997 | Nitschke et al. | 429/35 |
| 2001/0021470 | A1 * | | 9/2001 | May et al. | 429/44 |
| 2002/0033048 | A1 * | | 3/2002 | McIntosh et al. | 73/514.32 |

FOREIGN PATENT DOCUMENTS

| | | |
|---|---|---|
| JP | 03-102771 | 4/1991 |
| JP | 06-052868 | 2/1994 |
| JP | 2001-093538 | 4/2001 |
| JP | 2001-351642 | 12/2001 |
| JP | 2002-075393 | 3/2002 |
| JP | 2002-260681 | 9/2002 |

* cited by examiner

*Primary Examiner*—Patrick Joseph Ryan
*Assistant Examiner*—Alix Echelmeyer
(74) *Attorney, Agent, or Firm*—Arent Fox PLLC

(57) ABSTRACT

Gold is coated on a surface of a stainless steel plate containing an intermetallic compound forming element which forms an intermetallic compound by reacting with gold, and then the entirety is heated to form an intermetallic compound layer comprising the intermetallic compound at the interface between the stainless steel plate and the gold coated layer. In this way, exfoliation of the gold coated layer which is arranged on the surface of the stainless steel plate to obtain extremely high corrosion resistance can be prevented for a long time, and thus great durability can be maintained.

9 Claims, 4 Drawing Sheets

SEPARATOR FOR FUEL CELL AND METHOD FOR PREPARATION THEREOF

BACKGROUND OF INVENTION

1. Technical Field

The present invention relates to a separator for polymer electrolyte fuel cells and to a method of manufacturing therefor.

2. Background Art

A unit of a polymer electrolyte fuel cell is formed by laminating separators at both sides of a tabular membrane electrode assembly (MEA), and then plural units are laminated to form a fuel cell stack. The membrane electrode assembly is a three-layered structure in which an electrolyte membrane composed of an ion exchange resin or the like is arranged between a pair of gas diffusion electrodes forming a cathode and an anode. The gas diffusion electrode is a structure in which a gas diffusion layer is formed on an outer surface of an electrode catalytic layer contacting the electrolyte membrane. The separator is laminated to contact the gas diffusion layer of the membrane electrode assembly, and a gas passage in which gas flows and a refrigerant passage are formed between the gas diffusion electrode and the separator. In such a fuel cell, hydrogen gas supplied through a gas passage facing on a gas diffusion electrode of the anode and oxidizing gas such as air or oxygen supplied through a gas passage facing on a gas diffusion electrode of the cathode electrochemically react and thereby generate electricity.

The separator supplies electrons generated by catalytic reaction of hydrogen gas at the anode side to an outer circuit, and on the other hand, the separator must have a function of supplying electrons from the outer circuit to the cathode. Therefore, a conductive material comprising, for example, a graphite-based material or a metal-based material, is used as the separator. In particular, the metal-based material is advantageous since it is superior in mechanical strength, and the weight and size can be reduced by reducing the thickness of the metallic plate. A metallic separator in which a thin plate of stainless steel or titanium alloy having high corrosion resistance is pressed to have uneven cross section can be used.

As the environmental factors when such a separator is operating in a fuel cell, following three factors can be considered.

1. Temperature: Since an operation temperature of a fuel cell is in a range from ordinary temperature to about 180° C., the separator is also used in this range.

2. pH: In a fuel cell, oxygen and hydrogen react to generate water. The water is generated as a vapor, although water droplets may form generated on the separator if the temperature of water vapor in the gas passage decreases. If the amount of water in droplets increases, water remains between the membrane electrode assembly and the separator. The water which adheres to the membrane electrode assembly is easily brought into contact with the electrolyte membrane. Therefore, substituents of the electrolyte membrane are liberated, hydrogen ions are generated in the water, and pH of the water is decreased. As a substituent of a fuel cell, sulfonic groups are common. Therefore, the water becomes acidic, and is, for example, such as sulfuric acid.

The substituent mentioned above is further explained. In a fuel cell, hydrogen ions generated from hydrogen at the catalyst at the hydrogen gas supplying side (anode) are supplied to a cathode catalyst. Then, the hydrogen ions react with oxidizing gas in the cathode catalyst, and thereby generate electricity continuously. Therefore, an electrolyte membrane of a fuel cell must be an electrolyte membrane of the cation conductive type in which hydrogen ions move from the anode side to the cathode side. Therefore, a functional group which combines with hydrogen ions must be present in a side-chain of the electrolyte membrane molecule. In a fuel cell, an acidic type substituent which combines with hydrogen ions is arranged in part of molecules of the electrolyte membrane to perform the above-mentioned function. Since this substituent is of the acidic type, acid is generated if the substituent is liberated from the electrolyte membrane. Generally, to increase transport efficiency of hydrogen ions in electrolyte membranes, a strongly acidic type which strongly combines with hydrogen ions is used as this substituent. Therefore, the substituent is liberated, generating acid, and this acid reduces the pH.

3. Electric potential: The separators are arranged at the fuel gas side and the oxidizing gas side and work as the cathode and the anode of the cell. Electromotive force by the reaction occurs between these two separators as a potential difference. Generally, the maximum potential difference occurring by the electromotive force of the fuel cell in which hydrogen as a fuel gas and oxygen as an oxidizing gas are used, is about 1.2 V for the following reason. That is, in the range of operating temperatures of a fuel cell, electromotive force obtained by the chemical reaction in which water is generated by hydrogen and oxygen is about 1.2 V by theoretical calculation. In actual power generation, about 1 to 1.2 V can be generated. In the case in which an austenite based stainless steel plate having high corrosion resistance is used as the separator, the elution rate of metal ion is increased at over 0.9 V of electromotive force, and the separator may be corroded.

Since the separator of a fuel cell may be easily corroded under the conditions of temperature, pH, and electric potential as explained above, even in the case in which a metallic separator having high corrosion resistance (such as SUS316L) is used, the separator may be easily corroded. Therefore, extremely high corrosion resistance is required for the metallic separators in the operating environments of fuel cells. Furthermore, it is necessary for the metallic separator that a pressing process in which an uneven cross section is formed can be easily performed to form gas passages or coolant passages, and that contact resistance with other members be extremely low to prevent the generated voltage from deteriorating. Furthermore, low cost is also required because hundreds of separators may be used in one fuel cell stack in certain situations.

Therefore, as a separator for fuel cells, it is said to be desirable that a metal having high corrosion resistance be plated on a surface of a stainless steel which can be easily pressed. Corrosion resistance of SUS316L (stainless steel), Cu, Ag, Pt, and Au was compared by measuring each corrosion current density under conditions of temperature 90° C., voltage 1.2 V, in sulfuric acid solution of pH 3. The results were as follows.

SUS316L: 156 $\mu A/cm^2$
Cu: 98 $\mu A/cm^2$
Ag: 38 $\mu A/cm2$
Pt: 18 $\mu A/cm^2$
Au: 2 $\mu A/cm^2$

It is desirable that the corrosion current density be not more than 10 $\mu A/cm^2$ to maintain durability of the fuel cell in practical use. It is obvious that the metal which fulfills this requirement is gold. Therefore, a material such as a stainless steel plate which is plated with gold is desirable as a separator for a fuel cell.

However, in the case in which gold is plated on the stainless steel by an ordinary method, adhesion is not very high since gold merely adheres on stainless steel physically. Therefore, in the case in which a separator whose cross section is uneven and whose radius of curvature of a part is extremely small is formed by a pressing process, plated gold may be easily exfoliated. Furthermore, during prolonged operation of a fuel cell, gold may be lost since gold is a solid-solute and diffuses into Fe, Cr, and Ni which are main components of stainless steel. Therefore, high corrosion resistance and low contact resistance cannot be exhibited.

SUMMARY OF THE INVENTION

Therefore, an object of the present invention is to provide a separator for a fuel cell in which exfoliation of a gold plated layer from the surface of the stainless steel can be prevented to obtain extremely high corrosion resistance, and therefore great durability can be maintained for a long time, and to provide a method of manufacturing therefore.

The separator for fuel cells of the present invention is characterized in that an intermetallic compound layer comprising intermetallic compounds is formed on a surface of a stainless steel plate containing intermetallic compound forming elements which can form the intermetallic compound by reacting with gold, and a gold covering layer is formed on the surface of the intermetallic compound layer.

Ordinarily, plated gold is physically adhered on a stainless steel which is a base material, and the adhering force strongly depends on the surface roughness of the base material. This is an anchor effect in which gold attaches along uneven surfaces of the base material. In addition to such adhering force, chemical bonding strength is added in the present invention. That is, chemical bonding strength is given between atoms contained in the stainless steel and gold atoms along the interface between stainless steel which is a base material and a gold covering layer, and the material in which both atoms are chemically bonded is the intermetallic compound. Since the intermetallic compound layer comprising this intermetallic compound exists around the interface between the base material and gold covering layer, exfoliation of the gold covering layer can be prevented. In this case, gold dissolves into Fe which is the main component of stainless steel, and diffusion and solid solution of gold to the stainless steel can be prevented by an intermetallic compound layer existing between the stainless steel and the gold.

Another separator for a fuel cell of the present invention is characterized in that an intermetallic compound layer comprising an intermetallic compound is formed on the surface of a stainless steel, and a gold coating layer is formed on the surface of the intermetallic compound layer.

In the present invention, chemical bonding strength is given to the interface of stainless steel which is a base material and a gold covering layer, and the chemically combined material of both atoms is an intermetallic compound.

The present invention can supply a desirable method of manufacturing the separator for fuel cells. The manufacturing method of separator for fuel cells of the present invention is characterized in that gold is coated on the surface of a stainless steel plate containing intermetallic compound forming elements which can form intermetallic compounds by reacting with gold, and then the entirety is heated to form an intermetallic compound layer comprising an intermetallic compound around the interface between the stainless steel plate and the gold.

By the method described above, as shown in FIG. 1, an intermetallic compound layer is formed between a stainless steel which is a base material and a gold coating layer by heating. In addition, transition layers in which the contained ratio is gradually changed are formed between the gold coating layer and the intermetallic compound layer, and between the intermetallic compound layer and the base material. In this way, the existence of the obvious interface which may be a main cause of exfoliation of the gold covering layer can be reduced or eliminated.

In the present invention, the intermetallic compound forming element contained in the stainless steel plate must be an element which does not form an alloy with gold and which chemically reacts to form an intermetallic compound with gold, in a range of operating temperatures (ordinary temperature to about 180° C.) of a fuel cell under 1 atm. Furthermore, to meet a low contact resistance required as a property of the separator for a fuel cell, volume resistivity must be low. As an element having such a property, B, Cu, Mg, Mn, Nb, Pb, Ti, V can be used, one or more kinds selected from these elements can be contained in the stainless steel plate. The contained amount is an amount in which an intermetallic compound with gold can be appropriately generated.

Another method of manufacturing the separator for fuel cells of the present invention is a method which can appropriately produce the separator mentioned above. The method is characterized in that an intermetallic compound forming element layer composed of an intermetallic compound forming element which forms an intermetallic compound by reacting with gold is formed on the surface of the stainless steel, gold is coated on the surface of this intermetallic compound forming element layer, and the entirety is heated to form an intermetallic compound layer comprising the intermetallic compound at the interface between the stainless steel plate and the gold coating layer. To form an intermetallic compound forming element layer on the surface of the stainless steel plate, plating, vapor deposition, or sputtering of an intermetallic compound forming element can be performed.

FIG. 2 shows the concept described above. First, the intermetallic compound forming element layer is formed on the stainless steel plate which is the base material layer, and the gold coating layer (such as a gold plated layer) is formed on the intermetallic compound forming element layer. Next, if the entirety is heated, the intermetallic compound forming element layer changes to be an intermetallic compound layer.

As an intermetallic compound forming element, B, Cu, Mg, Mn, Nb, Pb, Ti, V can be used as explained above, and one or more kinds selected from these elements can be used.

EXAMPLES

The present invention is further explained by way of Examples.

(1) Production of the Separator 1

Intermetallic compound forming elements shown in Table 2 were added to a stainless steel mother alloy (corresponding to SUS316L) having compositions shown in Table 1, and the alloys were cast by a continuous casting to prepare stainless steels of Examples 1 to 8 and Comparative Example 1. The obtained steel materials were rolled to have a thickness of 0.2 mm. Plate materials for separators having a square shape of 100 mm by 100 mm were cut out from the stainless steels of Examples 1 to 8 and Comparative Example 1.

TABLE 1

| Composition of stainless steel plate (weight %) | | | | | | | | |
|---|---|---|---|---|---|---|---|---|
| C | Si | Mn | P | S | Ni | Cr | Mo | Fe |
| 0.03 | 0.5 | 2 | 0.04 | 0.03 | 13 | 17 | 2.5 | Balance |

Figure 1:
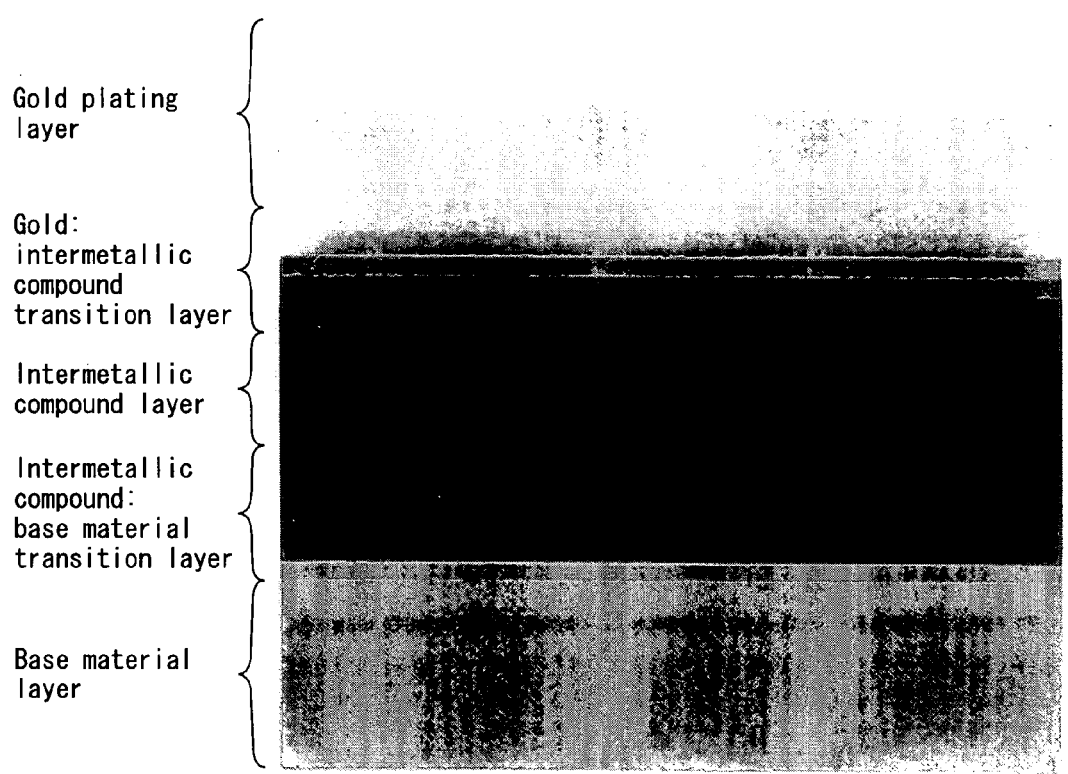
FIG. 1 is a drawing showing a conceptual cross section of a surface layer of the separator of the present invention.
Figure 2:
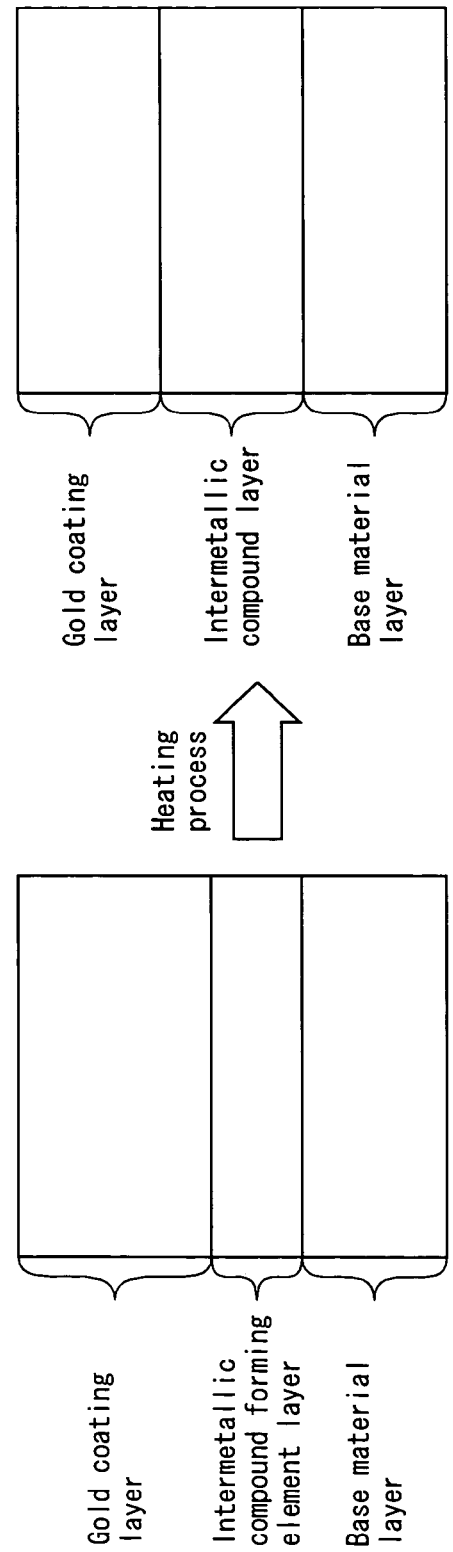
FIG. 2 is a cross sectional drawing of the surface layer of the separator showing a method of manufacturing the present invention conceptually.
Figure 3:
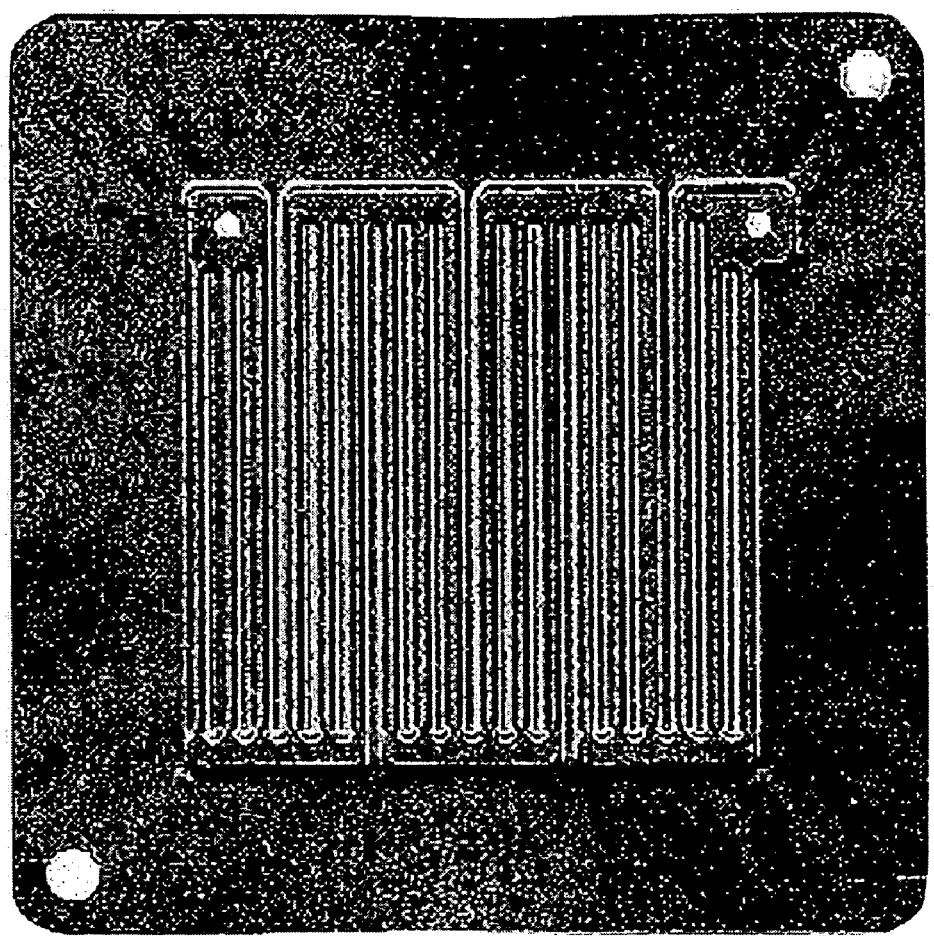
FIG. 3 is a photograph showing a surface of the separator produced in an Example of the present invention.

Next, gold was plated on the surface of these plate materials for separators to have a thickness of 1 μm under conditions of current density 1 A/dm² in a salt bath comprising 12 g/l of potassium cyano aurate, 125 g/l of potassium citrate, 3 g/l of cobalt ethylenediaminetetraacetate (Co salt of EDTA). Next, these plate materials for separators of Examples 1 to 8 on which gold was plated were heated to 900° C. for 10 minutes. On the other hand, the plate material of the separator of Comparative Example 1 was not heated. These plate materials of the separators of Examples 1 to 8 and Comparative Example 1 were pressed to obtain the separators of Examples 1 to 8 and Comparative Example 1 having shapes shown in FIG. 3. Whether or not the intermetallic compound was formed between the gold plated layer and the stainless steel plate, these separators were inspected. In the case in which the intermetallic compound was generated, the components were inspected. The results are shown in Table 2.

(2) Production of the Separator 2

Stainless steel mother alloy (corresponding to SUS316L) having compositions shown in Table 1 was cast by a continuous casting, and the obtained steel material was rolled to have a thickness of 0.2 mm to produce stainless steel plates. Next, square steel plates having dimensions of 100 mm by 100 mm were cut out from this stainless steel plate to prepare plate materials for separators of Examples 9 to 16 and Comparative Example 2. Next, intermetallic compound forming elements shown in Table 3 were coated on the surface of the plate materials for separators of Examples 9 to 16 to form intermetallic compound forming element layers. To form the intermetallic compound forming element layers, as shown in Table 3, sputtering was performed in Example 9 and 11 to 16, and plating (copper plating) was performed in Example 10.

TABLE 2

| | Intermetallic compound forming element: Added amount (weight %) | Heating temperature to form intermetallic compound (° C.) | Formed intermetallic compound | Adhesion (Initial) | Adhesion (After power generation) |
|---|---|---|---|---|---|
| Example 1 | B: 0.5 | 900 | AuB$_2$ | ○ | ○ |
| Example 2 | Cu: 1 | 900 | Au$_3$Cu, AuCu, AuCu$_3$ | ○ | ○ |
| Example 3 | Mg: 0.5 | 900 | Mg$_3$Au, MgAu, Mg$_2$Au | ○ | ○ |
| Example 4 | Mn: 3 | 900 | AuMn$_2$ | ○ | ○ |
| Example 5 | Nb: 0.1 | 900 | Au$_2$Nb, Au$_2$Nb$_3$, AuNb$_3$ | ○ | ○ |
| Example 6 | Pb: 0.5 | 900 | Au$_2$Pb, AuPb$_2$, AuPb$_3$ | ○ | ○ |
| Example 7 | Ti: 1 | 900 | Ti$_3$Au, TiAu, TiAu$_2$, TiAu$_4$ | ○ | ○ |
| Example 8 | V: 1 | 900 | V$_3$Au, VAu$_2$, VAu$_4$ | ○ | ○ |
| Comparative Example 1 | Not added | — | Not formed | X | X |

TABLE 3

| | Intermetallic compound forming element: Forming method | Heating temperature to form intermetallic compound (° C.) | Formed intermetallic compound | Adhesion (Initial) | Adhesion (After power generation) |
|---|---|---|---|---|---|
| Example 9 | B: Sputtering | 900 | AuB$_2$ | ○ | ○ |
| Example 10 | Cu: Plating | 900 | Au$_3$Cu, AuCu, AuCu$_3$ | ○ | ○ |
| Example 11 | Mg: Sputtering | 900 | Mg$_3$Au, MgAu, Mg$_2$Au | ○ | ○ |
| Example 12 | Mn: Sputtering | 900 | AuMn$_2$ | ○ | ○ |
| Example 13 | Nb: Sputtering | 900 | Au$_2$Nb, Au$_2$Nb$_3$, AuNb$_3$ | ○ | ○ |

TABLE 3-continued

|  | Intermetallic compound forming element: Forming method | Heating temperature to form intermetallic compound (° C.) | Formed intermetallic compound | Adhesion (Initial) | Adhesion (After power generation) |
|---|---|---|---|---|---|
| Example 14 | Pb: Sputtering | 900 | $Au_2Pb$, $Au_2Pb_2$, $AuPb_3$ | ◯ | ◯ |
| Example 15 | Ti: Sputtering | 900 | $Ti_3Au$, $TiAu$, $TiAu_2$, $TiAu_4$ | ◯ | ◯ |
| Example 16 | V: Sputtering | 900 | $V_3Au$, $VAu_2$, $VAu_4$ | ◯ | ◯ |
| Comparative Example 2 | Not added | — | Not formed | X | X |

Figure 4:
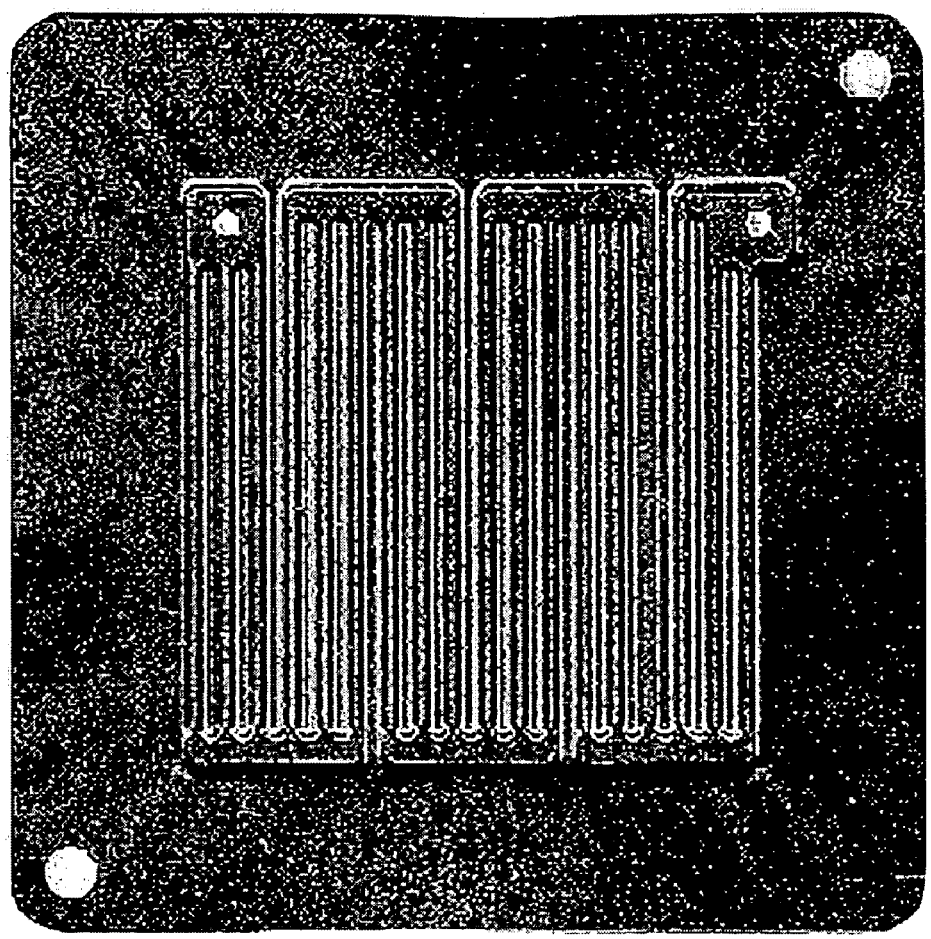
FIG. 4 is a photograph showing a surface of the separator produced in an Example of the present invention.

Next, gold was plated on the surface of the plate materials for separators of Examples 9 to 16 in which each intermetallic compound forming element layer was formed, and on the surface of the plate material of Comparative Example 2 which is a raw stainless steel, to have a thickness of 1 μm under conditions of current density 1 A/dm² in a salt bath comprising 12 g/l of potassium cyano aurate, 125 g/l of potassium citrate, 3 g/l of cobalt ethylenediaminetetraacetate (Co salt of EDTA). Next, these plate materials for separators of Examples 9 to 16 in which gold was plated was heated to 900° C. for 10 minutes. On the other hand, the plate material for separators of Comparative Example 2 was not heated. These plate materials for separators of Examples 9 to 16 and Comparative Example 2 were pressed to obtain separators of Examples 9 to 16 and Comparative Example 2 having shapes shown in FIG. 4. Whether or not the intermetallic compound was formed between the gold plated layer and the stainless steel plate, these separators were inspected. In the case in which the intermetallic compound was formed, the components were inspected. The results are shown in Table 3.

(3) Adhesion Evaluation Test 1

A. Initial Adhesion

Exfoliation of gold plating on the separators of Examples 1 to 8 and Comparative Example 1 was visually inspected and evaluated. A separator was evaluated as ◯ in the case in which no exfoliation was observed, and a separator was evaluated as × in the case in which exfoliation and exposure of a plate material of the separator (stainless steel plate) was observed. The results are shown in Table 2.

B. Adhesion After Power Generation

A membrane electrode assembly was placed between a pair of separators of Example 1 to 8 and Comparative Example 1 to prepare single cell units of a fuel cell. Power generation tests of these units was performed for 2000 hours, and exfoliation of plated gold on each separator was observed and evaluated in the same way as described above. The results are shown in Table 2.

As is clear in Table 2, separators of Examples 1 to 8 in which the intermetallic compound was formed between the gold plated layer and the base material exhibited sufficient adhesion before and after power generating, and had high durability. It seems that the separator exhibits extremely high corrosion resistance. On the other hand, in the case of the separator of Comparative Example 1 in which heating was not performed and the intermetallic compound was not formed, plated gold exfoliated during the pressing process.

(4) Adhesion Evaluation Test 2

A. Initial Adhesion

Exfoliation of gold plating on the separators of Examples 9 to 16 and Comparative Example 2 was visually inspected and evaluated. A separator was evaluated as ◯ in the case in which no exfoliation was observed, and a separator was evaluated as × in the case in which exfoliation and exposure of a plate material of the separator (stainless steel plate) was observed. The results are shown in Table 3.

B. Adhesion After Power Generation

A membrane electrode assembly was placed between a pair of separators of Example 9 to 16 and Comparative Example 2 to prepare single cell units of a fuel cell. Power generation tests of these units was performed for 2000 hours, and exfoliation of plated gold on each separator was observed and evaluated in the same way as described above. The results are shown in Table 3.

As is clear in Table 3, separators of Examples 9 to 16 exhibited sufficient adhesion before and after power generation, and had high durability. It seems that the separators exhibit extremely high corrosion resistance. On the other hand, in the case of the separator of Comparative Example 2 in which the intermetallic compound forming element layer was not formed on the surface of the base material and heating after gold plating was not performed, plated gold exfoliated during the pressing process and the durability thereof was reduced.

What is claimed is:

1. A separator for a fuel cell, comprising:
    a stainless steel plate containing an intermetallic compound forming element which forms an intermetallic compound by reacting with gold;
    an intermetallic compound layer formed by reacting the intermetallic compound forming element with gold on the surface of the stainless steel plate; and
    a gold coating layer formed on the surface of the intermetallic compound layer.

2. The separator for a fuel cell according to claim 1, wherein the intermetallic compound forming element is one or more elements selected from B, Cu, Mg, Mn, Nb, Pb, Ti, and V.

3. A separator for a fuel cell, comprising:
    a stainless steel plate;
    an intermetallic compound layer composed of intermetallic compounds coated on a surface of the stainless steel plate; and a gold coating layer formed on a surface of the intermetallic compound layer, wherein the intermetallic compound layer is formed by reacting an intermetallic compound forming element layer coated on the surface of the stainless steel plate with gold.

4. The separator for a fuel cell according to claim 3, wherein the intermetallic compound layer is formed by heating the intermetallic compound forming element, the intermetallic compound forming element is one or more elements selected from B, Cu, Mg, Mn, Nb, Pb, Ti, and V.

5. A method for manufacturing a separator for a fuel cell, comprising:

adding an intermetallic compound forming element to a stainless steel mother alloy, thereby producing a stainless steel plate;

coating gold on a surface of a the stainless steel plate; and heating the entirety to form an intermetallic compound layer composed of intermetallic compounds by reacting the intermetallic compound forming element with gold at the interface between the stainless steel plate and the gold coating layer.

6. A method for manufacturing a separator for a fuel cell, comprising:

coating an intermetallic compound forming element layer composed of an intermetallic compound forming element which forms an intermetallic compounds by reacting with gold on the surface of a stainless steel plate;

coating gold on a surface of the intermetallic compound forming element layer;

heating the entirety to form an intermetallic compound layer formed by reacting the intermetallic compound forming element with gold at the interface between the stainless steel plate and the gold coating layer.

7. The method for manufacturing a separator for a fuel cell according to claim 5 or 6, wherein the intermetallic compound forming element is one or more elements selected from B, Cu, Mg, Mn, Nb, Pb, Ti. and V.

8. A separator for a fuel cell according to claim 1, wherein transition layers in which the contained ratio is gradually changed are formed between the gold coating layer and the intermetallic compound layer.

9. A separator for a fuel cell according to claim 3, wherein transition layers in which the contained ratio is gradually changed are formed between the gold coating layer and the intermetallic compound layer.

* * * * *